Figure 1:
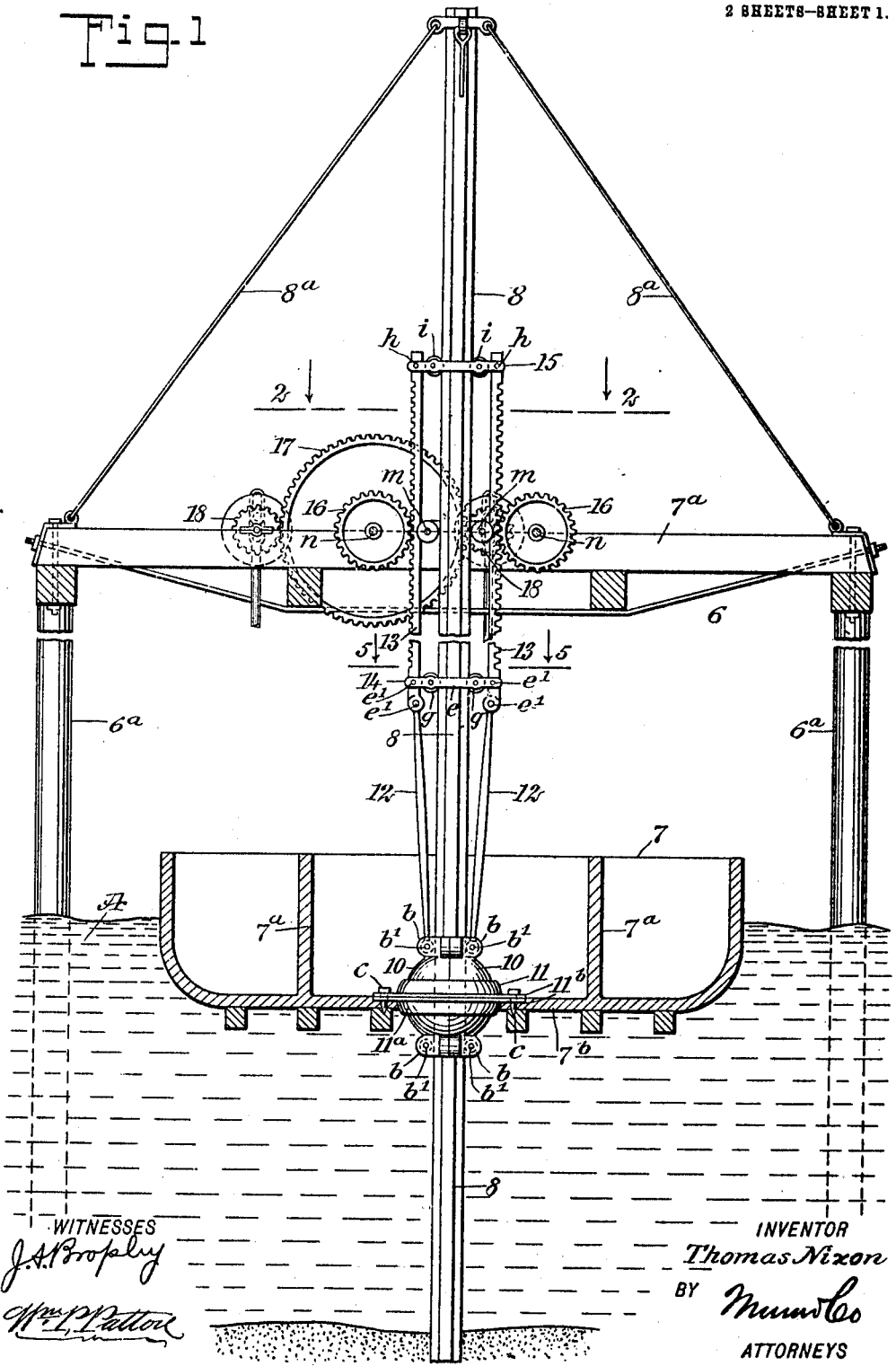

T. NIXON.
WAVE MOTOR.
APPLICATION FILED MAR. 4, 1910.

978,628.

Patented Dec. 13, 1910.
2 SHEETS—SHEET 1.

WITNESSES

INVENTOR
Thomas Nixon
BY
Munn & Co.
ATTORNEYS

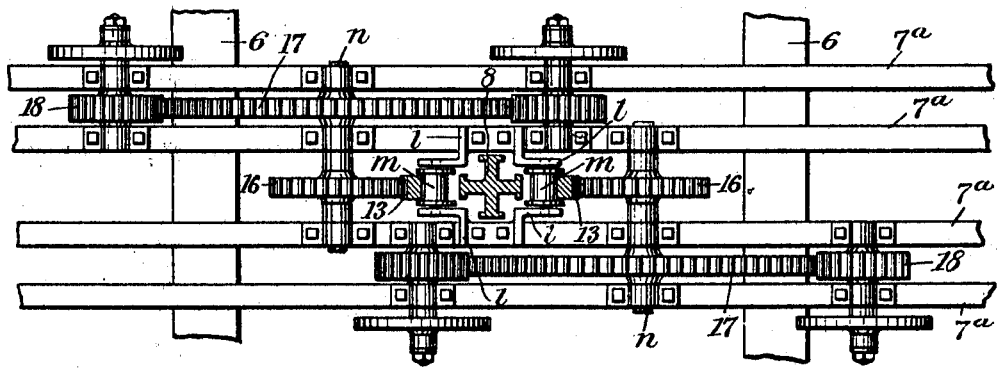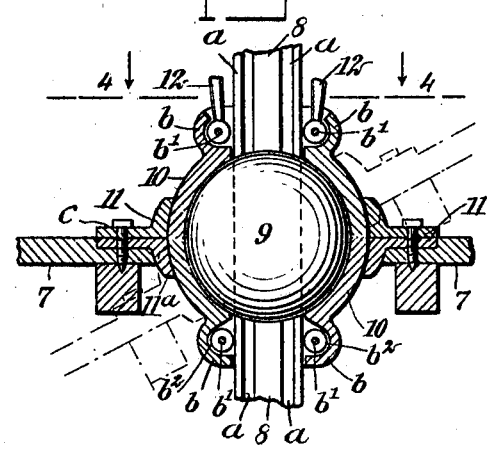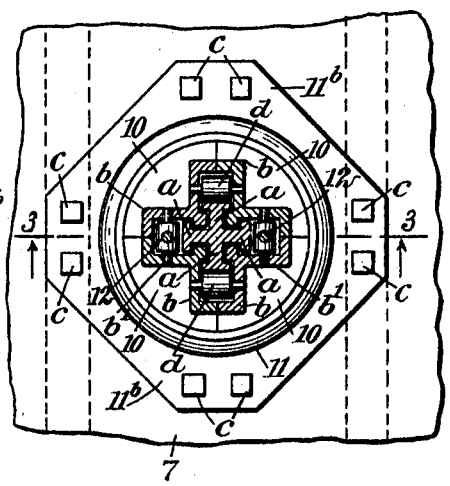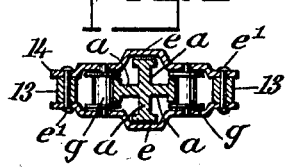

UNITED STATES PATENT OFFICE.

THOMAS NIXON, OF SANTA BARBARA, CALIFORNIA.

WAVE-MOTOR.

978,628.

Specification of Letters Patent. Patented Dec. 13, 1910.

Application filed March 4, 1910. Serial No. 547,277.

*To all whom it may concern:*

Be it known that I, THOMAS NIXON, a citizen of the United States, and a resident of Santa Barbara, in the county of Santa Barbara and State of California, have invented a new and Improved Wave-Motor, of which the following is a full, clear, and exact description.

The purpose of my invention is to provide novel details of construction for a wave motor, which adapt the apparatus to receive impulses from wave agitation of a body of water, convert these impulses into reciprocal motion in a vertical plane, and then into rotary motion for utilizing the energy developed by the conservation of wave force.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a partly sectional side view of the improved wave motor, supported in connection with a body of water for operation by wave agitation thereof; Fig. 2 is a partly sectional plan view of the supported apparatus, taken substantially on the line 2—2 in Fig. 1; Fig. 3 is an enlarged vertical transverse sectional view of novel details, taken substantially on the line 3—3 in Fig. 4; Fig. 4 is an enlarged partly sectional plan view of the same, substantially on the line 4—4 in Fig. 3; and Fig. 5 is a horizontal transverse sectional view, substantially on the line 5—5 in Fig. 1.

For the convenient support in proper relative positions of the operative details of the improved wave motor, a wharf 6 is erected over a body of water A, the waves of which are to be utilized for useful effect.

As shown in Fig. 1, the wharf 6 consists of a substantial platform of suitable area, supported horizontally by piles $6^a$ that are driven into the bed of the body of water A, which is subjected to tidal or wave action. A float 7, of sufficient dimensions for effective service and strongly built, is provided for flotation in the body of water A, and to confer strength thereto and produce two spaced water-tight compartments, two partitions $7^a$ are erected in the float at equal distances from the side walls thereof.

A mast 8 is erected from the bottom of the stream or body of water A and passes centrally through an opening in the bottom wall $7^b$ of the float 7, special means for connecting the mast with the float being hereinafter described. The mast 8 is preferably formed of steel, having a suitable height and substantially of cruciform contour in cross section, affording four wings $a$ of an equal length that are opposite in pairs, the outer ends of said paired wings having flat surfaces that are parallel with each other. The vertical mast 8 trends upward above the float and through an opening in the flooring of the wharf 6, the upper end of said mast being stayed by guy rods $8^a$, as shown in Fig. 1.

Referring particularly to the connection between the mast 8 and the float 7, this consists of the following described parts: A ball 9 is slidably mounted upon the mast 8, and has a central aperture therein, shaped in its defining wall to loosely fit on or over the wings $a$ on the mast. A hollow casing, formed of four equal segments 10 loosely receives the ball 9, and said segments that neatly fit together at their meeting edges, are given spherical form exteriorly, with the exception of their upper and lower portions near the central opening in the ball they envelop, where ears $b$ are formed on the segments, that serve as hinge leaves. A clamp, formed of two sections 11, $11^a$, is provided for loosely embracing the four segments 10 and holding them together so that they embrace the ball 9. Each clamping section 11, $11^a$, is in the form of a ring having a concaved inner surface and a radial flange $11^b$, projected from the lower edge of the ring-like body, said flanges being seated one upon the other when arranged for service and secured upon the bottom wall of the float 7 on its upper or inner side by means of bolts $c$. The concavity of the inner surfaces of the ring-shaped clamps 11, $11^a$ is such, that they will have an intimate engagement with the exterior surfaces of the segments 10, and serve to loosely secure said segments engaged with the float, in a manner which will permit said float to rock in any direction in response to wave action.

Between the ears $b$ on the upper portion of the segments 10, that are disposed opposite in pairs, the lower ends of two similar connecting rods 12 are introduced, one between each pair thereof and are pivoted thereon, as is indicated in Figs. 1, 3 and 4 at $b'$, and the remaining ears $b$ on said upper portions of the segments 10 and that are adjacent in pairs, afford support for the journal ends of rollers $d$. The ears $b$, that are disposed oppositely in pairs at the lower ends of the segments 10, are secured together by pivots $b'$, that support rollers $b^2$ that are similar to the rollers $d$, and as represented in Figs. 3 and 4 each of the rollers specified is disposed opposite to and has loose engagement with the flat end walls of the wings $a$ on the mast 8. Two similar side plates $e$ for a cross head 14 are held spaced apart by two rack bars 13, that project upwardly, said rack bars near their lower ends, being pivoted as at $e'$ between the ends of the side plates, and said lower ends are downwardly extended and pivoted upon the upper ends of the connecting rods 12, as shown in Fig. 1. The side plates $e$ are bent at their centers, so as to have clearance from the adjacent wings $a$ on the mast 8, and near the other oppositely-disposed pair of wings $a$, said plates are rendered parallel, these portions receiving two rollers $g$ that are pivoted therebetween and respectively have contact with the flat free outer surface of a wing $a$, this construction being clearly shown in Fig. 5.

A cross head 15, similar to the cross head 14, is mounted upon the upper portion of the mast 8, and between the ends of the side plates thereof, the ends of the rack bars 13 are inserted and pivoted as shown at $h$ in Fig. 1, and in the same view two rollers $i$ are indicated, which have a loose engagement with the opposite edges of the wings $a$ of the mast 8. The rack bars 13 are disposed parallel with each other by the cross heads 14, 15, and it will be apparent that the rocking movement and perpendicular wave action sustained by the float 7, will be converted into a vertical reciprocatory movement of the rack bars. Furthermore, it will be noted that the ball and socket connection between the float 7 and mast 8, permits a free vertical reciprocation of the float due to wave action thereon, and also an inclination of the float in any direction within an angle of 45 degrees.

Upon the wharf 6, a gear-supporting frame is mounted, consisting of parallel timbers $7^a$ that are suitably spaced apart, four of said frame timbers being shown in Fig. 2. Upon the pair of frame timbers $7^a$, that are disposed near to and each side of the mast 8, two pairs of right angularly-bent bracket arms $l$ are secured by their corresponding members, thus disposing the remaining members of each pair of arms respectively near to the opposite wings $a$ on the mast 8 and also adjacent to the respective rack bars 13. Between each pair of spaced bracket arms $l$, a roller $m$ is journaled, that has a bearing upon the back wall of an adjacent rack bar 13, between the ends thereof, and thus affords support to the rack bars. Between the frame timbers $7^a$, that carry the bracket arms $l$, two spur gears 16 are supported by shafts $n$, that are journaled in boxes mounted on the gear frame, said gears respectively meshing with the teeth of the rack bars, as is shown in Figs. 1 and 2. On the shafts $n$, which extend at one end of each, respectively, toward the outer frame timbers $7^a$ and are journaled thereon, a large spur gear 17 is mounted and secured on each of said extensions, and meshing with said large gears are smaller spur gears 18, also rotatably supported on the gear frame, and that may transmit rotary motion and power to machinery of any character, not shown, and thus utilize the power developed by the improved wave motor for useful effect.

Having thus described my invention, I claim as new and desire to secure by Letters Patent:

1. The combination with a mast, erected in a body of water subjected to wave action, of a float in the water, a universal joint connection between the mast and float, rack bars supported from the mast, gearing engaged by the rack bars and receiving motion therefrom, and connections between the rack bars and the universal joint connection.

2. The combination with a mast erected in a body of water subjected to wave action, of a float in the water, and a universal joint connection mounted on the float engaging the mast, said connection being adapted for vertical and lateral movement corresponding with such movements of the float, rack bars, and connections between the rack bars and the universal joint connection.

3. The combination with a wharf erected above a body of water that is subjected to wave action, of a float in the water, a mast erected in the water and passing through the float and wharf, and a rockable, slidable connection between the mast and the float, the said connection comprising a ball slidable vertically on the mast, a casing loosely receiving the ball, and a clamp loosely embracing the casing and secured to the float.

4. The combination with a wharf erected above a body of water subjected to wave action, a float in the water, and a mast erected in the water and passing up through the float and wharf, of a slidable, universal joint connection between the float and the mast, connecting rods jointed at their lower ends on the universal joint connection, and rack bars pivoted on the upper ends of said connecting rods and supported in parallel planes from the intervening mast.

5. The combination with a wharf erected above a body of water subjected to wave action, a float in the water, and a mast erected in the water and passing up through the float and wharf, of a universal joint connection rockably secured on the float and slidable on the mast, two connecting rods pivoted at their lower ends on the upper portion of the universal joint connection, two rack bars pivoted at their lower ends on the upper ends of the connecting rods, a cross head secured at its ends on the lower portions of the rack bars and having rollers that contact with the mast, and a similar cross head having the ends thereof secured on the upper ends of the rack bars and carrying rollers that engage the mast.

6. The combination with a wharf erected above a body of water subjected to wave action, a float in the water, and a mast erected in the water and passing up through the float and wharf, of a universal joint connection held in rockable engagement with the float and slidable on the mast, two connecting rods pivoted at their lower ends on the upper portion of the universal joint connection, two rack bars pivoted at their lower ends on the upper ends of the connecting rods, two cross heads respectively secured by their ends on the lower and upper portions of the rack bars and disposing said bars in parallel, vertical planes, rollers carried by the cross heads and having contact with the mast, and gearing on the wharf that engages the rack bars and receives rotary motion therefrom.

7. The combination with a mast erected in a body of water subjected to wave action, of a float in the water, and a universal joint connection between the float and the mast, comprising a spherical ball slidable on the mast, a plurality of coupling segments that encompass the ball and are spherical shaped exteriorly, means for connecting together the end portions of the segments, and a clamp formed of two mating ring-shaped sections that loosely embrace the segments, said sections having a radial flange projected from each and clamped together on the bottom wall of the float.

8. The combination with a mast erected in a body of water subjected to wave action, of a float in the water through which the mast passes, a universal joint connection between the float and the mast, comprising a ball slidable vertically on the mast, a casing formed in sections and loosely receiving the ball, and a clamp embracing the casing sections and secured to the bottom of the float.

9. The combination with a mast erected in a body of water subjected to wave action, of a float in the water, a universal joint connection between the mast and the float, the said connection being held in rockable engagement with the float and having sliding connection with the mast, a member having guided vertical movement, a connection between the said member and the universal joint connection, and mechanism connected with said member and receiving rotary motion therefrom.

In testimony whereof I have signed my name to this specification in the presence of two subscribing witnesses.

THOMAS NIXON.

Witnesses:
  GEO. E. SAWYERS,
  JOHN S. EDWARDS.